United States Patent [19]

Yoshimura et al.

[11] Patent Number: 4,599,397

[45] Date of Patent: Jul. 8, 1986

[54] WHOLLY AROMATIC POLYESTER AND PROCESS FOR PRODUCING THE SAME

[75] Inventors: Tamotsu Yoshimura, Machida; Masahiko Nakamura, Tokyo; Atsushi Kasai, Yokohama, all of Japan

[73] Assignee: Mitsubishi Chemical Industries Ltd., Tokyo, Japan

[21] Appl. No.: 683,518

[22] Filed: Dec. 19, 1984

[30] Foreign Application Priority Data

Jul. 6, 1984 [JP] Japan ................. 49-140391

[51] Int. Cl.⁴ ............................... C08G 63/18
[52] U.S. Cl. .................... 528/190; 528/125; 528/126; 528/128; 528/173; 528/176; 528/191; 528/193; 528/194; 528/271
[58] Field of Search .......... 528/125, 126, 128, 173, 528/176, 190, 191, 193, 194, 271

[56] References Cited

U.S. PATENT DOCUMENTS

| | | | |
|---|---|---|---|
| 3,991,013 | 11/1976 | Pletcher | 528/193 |
| 4,083,829 | 4/1978 | Calundann et al. | 528/190 |
| 4,118,372 | 10/1978 | Schaefen | 528/193 |
| 4,153,779 | 5/1979 | Jackson, Jr. et al. | 528/193 |
| 4,238,600 | 12/1980 | Jackson, Jr. et al. | 528/193 |
| 4,242,496 | 12/1980 | Jackson, Jr. et al. | 528/193 |
| 4,287,332 | 9/1981 | Jackson, Jr. et al. | 528/193 |
| 4,347,349 | 8/1982 | Jackson, Jr. et al. | 528/193 |
| 4,355,134 | 10/1982 | Charbonneau et al. | 528/190 |
| 4,360,658 | 11/1982 | Jackson, Jr. et al. | 528/193 |
| 4,370,466 | 1/1983 | Siemionko | 528/193 |
| 4,447,593 | 5/1984 | Funakoshi et al. | 528/190 |

FOREIGN PATENT DOCUMENTS 0120671 of 0000 European Pat. Off. .
0095938 of 0000 European Pat. Off. .
0072540 of 0000 European Pat. Off. .

Primary Examiner—Lester L. Lee
Attorney, Agent, or Firm—Oblon, Fisher, Spivak, McClellan & Maier

[57] ABSTRACT

Disclosed herein is a wholly aromatic polyester comprising the structural units represented by the formulae (A), (B), (C), (D), and (E)

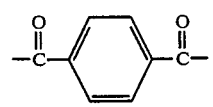

(A)

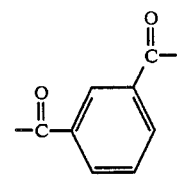

(B)

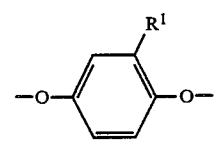

(C)

wherein $R^1$ represents a halogen atom, a hydrocarbon group, an alkoxy group or a phenoxy group

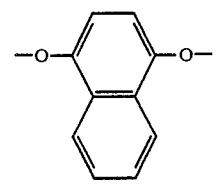

(D)

and

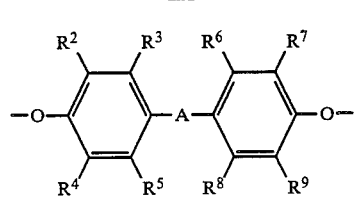

(E)

wherein A represents an oxygen atom, a sulfur atom, a sulfonyl group, a carbonyl group, an alkylene group or an alkylidene group, or a single bond directly (Abstract continued on next page.)

connecting the two benzene rings and $R^2$, $R^3$, $R^4$, $R^5$, $R^6$, $R^7$, $R^8$ and $R^9$ represent respectively a hydrogen atom, a halogen atom or a hydrocarbon group, the wholly aromatic polyester containing 5 to 50 mol % of the unit (A), 5 to 45 mol % of the unit (B), 5 to 45 mol % of the unit (C), 5 to 20 mol % of the unit (D) and 0 to 10 mol % of the unit (E), and the sum of the amounts of the unit (A) and the unit (B) and the sum of the amounts of the unit (C), the unit (D) and the unit (E) being substantially equimolar, and a process for producing the same.

20 Claims, 1 Drawing Figure

WHOLLY AROMATIC POLYESTER AND PROCESS FOR PRODUCING THE SAME

BACKGROUND OF THE INVENTION

The present invention relates to a novel, wholly aromatic polyester which can be subjected to melt-polymerization and to melt-molding and is excellent in mechanical properties.

Recently, the demand for the material excellent in rigidity, heat-resistance and resistance to chemicals and usable for preparing anything such as fibers, films and molded articles has been raised. Although polyester is broadly recognized as the material for preparing the general molded articles, polyester has not been suitable for the use requiring a high strength, because of the poor mechanical property such as flexural modulus. In order to improve the mechanical property of polyester, a method for blending a reinforcing agent such as calcium carbonate, glass fibers, etc. with polyester has been known. However, after having been blended, the density of the thus blended material becomes too large thereby to reduce the merit of the plastic material, that is, the lightness in weight, and further, in the time of molding, the abrasion, etc. of the molding machine is very severe thereby causing the practical problems.

As the polyester which does not need any reinforcing agent and is suitable for the use requiring a high strength, liquid crystalline polyester has been attracted one's attention in recent years. Since the time when W. J. Jackson published a thermally liquid crystalline high polymer comprising polyethylene terephthalate and hydroxybenzoic acid in "Journal of Polymer Science", Chemistry Edition, Vol. 14, page 2043(1976), such a specified polyester has been attracted one's attention particularly. In his publication, Jackson reported that the liquid crystalline high polymer exhibited a rigidity of more than 5 times, a strength of more than 4 times and a impact strength of more than 25 times that of polyethylene terephthalate, thereby showing the new possibility to a resin of high performances. Then, the development of liquid crystalline polyester have been continuously conducted while aiming at the coexistence of the improvement of strength and rigidity and the melt-moldability as seen in Japanese Patent Applications Laying-Open No. 53-65421, No. 54-50594, No. 55-21491, No. 55-50022 and No. 55-106220. However, in spite of the proposals of more than 100 kinds of liquid crystalline polyester, no successful polyester as the material for molded articles is offered. This is due to the large orientability of the polymer in a molten state thereof resulting in a high anisotropy of the mechanical properties.

The present inventors, as a result of their studies for relaxing the anisotropy of the mechanical properties of the liquid crystalline polyester, have attained at the present invention.

BRIEF EXPLANATION OF DRAWING

Of the attached drawing.

SUMMARY OF THE INVENTION

Figure 1:
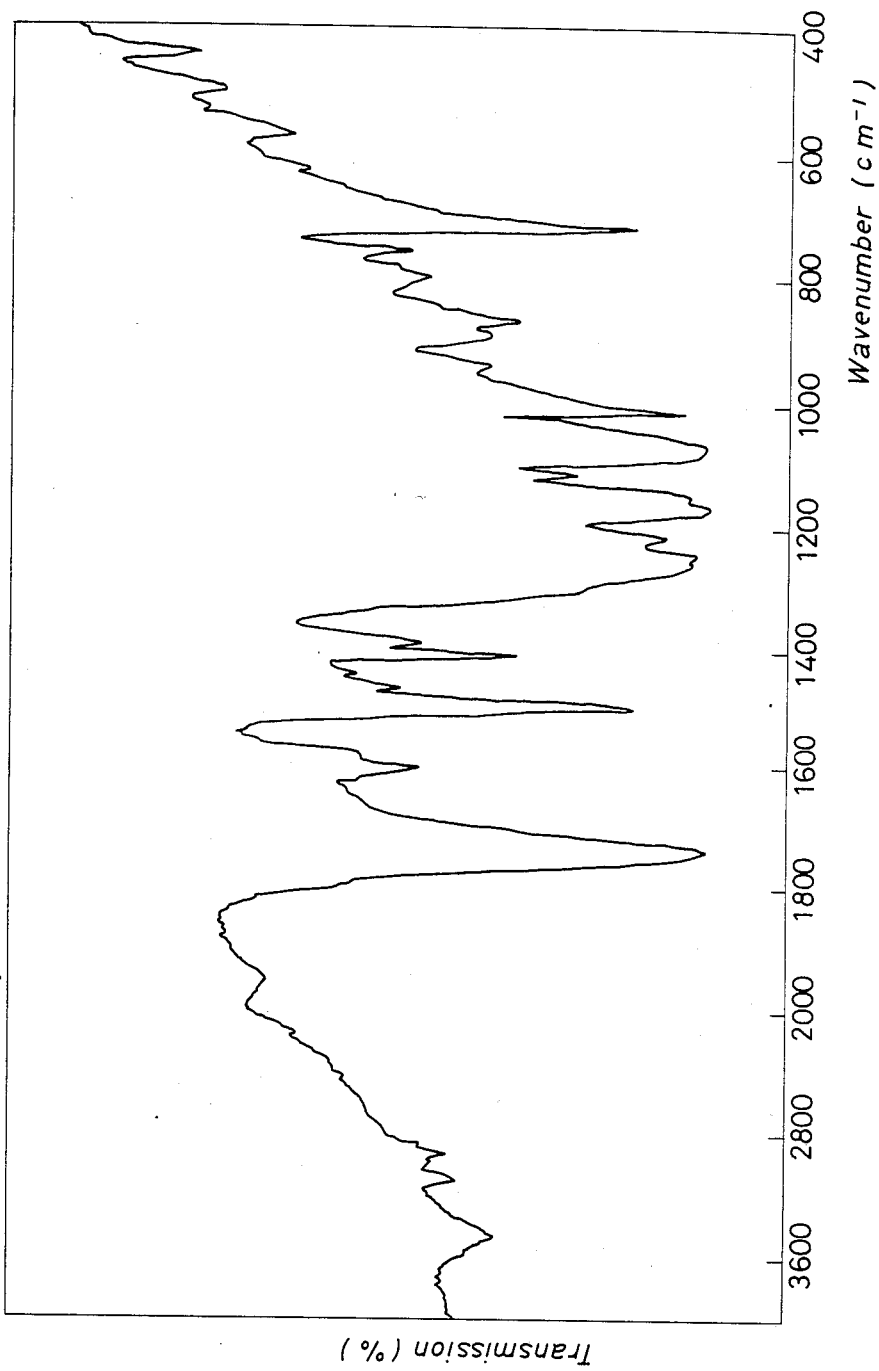
FIG. 1 is the infrared absorption spectrum of the polyester obtained in Example 1 while taking the transmittance in the ordinate and taking the wave number (cm$^{-1}$) in the abscissa.

In a first aspect of the present invention, there is provided a wholly aromatic polyester comprising the structural units represented by the formulae (A), (B), (C), (D) and (E)

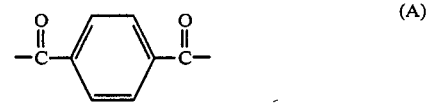
(A)

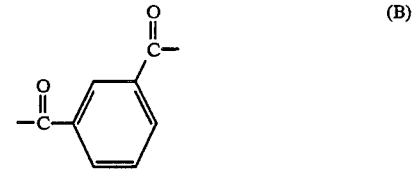
(B)

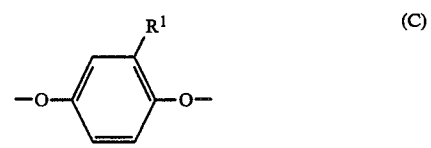
(C)

wherein $R^1$ represents a halogen atom, a hydrocarbon group, an alkoxy group or a phenoxy group

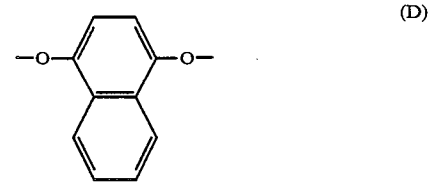
(D)

and

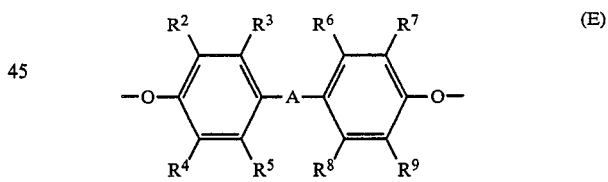
(E)

wherein A represents an oxygen atom, a sulfur atom, a sulfonyl group, a carbonyl group, an alkylene group or an alkylidene group, or a single bond directly connecting the two benzene rings and $R^2$, $R^3$, $R^4$, $R^5$, $R^6$, $R^7$, $R^8$ and $R^9$ represent respectively a hydrogen atom, a halogen atom or a hydrocarbon group, the wholly aromatic polyester containing 5 to 50 mol % of the unit (A), 5 to 45 mol % of the unit (B), 5 to 45 mol % of the unit (C), 5 to 20 mol % of the unit (D) and 0 to 10 mol % of the unit (E), and the sum of the amounts of the unit (A) and the unit (B) and the sum of the amounts of the unit (C), the unit (D) and the unit (E) being substantially equimolar.

In a second aspect of the present invention, there is provided a process for producing a wholly aromatic polyester comprising the structural units represented by the formulae (A), (B), (C), (D) and (E):

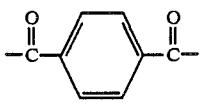
(A)

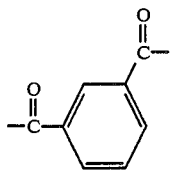
(B)

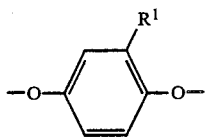
(C)

wherein $R^1$ represents a halogen atom, a hydrocarbon group, an alkoxy group or a phenoxy group,

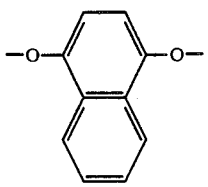
(D)

and

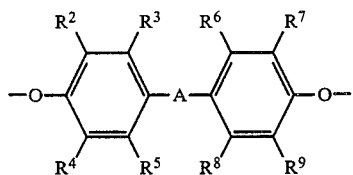
(E)

wherein A represents an oxygen atom, a sulfur atom, a sulfonyl group, a carbonyl group, an alkylene group or an alkylidene group or a single bond directly connecting the two benzene rings,
the wholly aromatic polyester containing 5 to 50 mol % of the unit (A), 5 to 45 mol % of the unit (B), 5 to 45 mol % of the unit (C), 5 to 20 mol % of the unit (D) and 0 to 10 mol % of the unit (E), and the sum of the amounts of the unit (A) and the unit (B) and the sum of the amounts of the unit (C), the unit (D) and the unit (E) being substantially equimolar,
which the process comprises subjecting terephthalic acid or a derivative thereof, isophthalic acid or a derivative thereof, 2-substituted hydroquinone or a derivative thereof, and 1,4-naphthalenediol or a derivative thereof, and/or bisphenol or a derivative thereof into polycondensation.

DETAILED DESCRIPTION OF THE INVENTION

The wholly aromatic polyester according to the present invention has characteristics that the polyester shows liquid crystallinity in a molten state, is melt-moldable and is small in anisotropy of the physical properties when molded into shaped articles, and in addition, is excellent in heat-resistance.

The wholly aromatic polyester according to the present invention comprises the five structural units represented by the formulae (A), (B), (C), (D) and (E).

The structural unit (A) is terephthaloyl group which is derived from terephthalic acid or a derivative thereof, for instance, an alkyl terephthalate, and the structural unit (A) is present in the wholly aromatic polyester in an amount of 5 to 50 mol %, preferably 30 to 45 mol %.

The structural unit (B) is isophthaloyl group which is derived from isophthalic acid or a derivative thereof, for instance, an alkyl isophthalate, and the structural unit (B) is present in the wholly aromatic polyester in an amount of 5 to 45 mol %, preferably 8 to 30 mol %.

The structural unit (C) is mono-substituted 1,4-phenylenedioxy group which is derived from 2-substituted hydroquinone or a derivative thereof, for instance, an alkyl ether thereof. The substituent of the structural unit (C) is a halogen atom, a hydrocarbon group, an alkoxy group or a phenoxy group, and the structural unit (C) is derived from, for instance, methylhydroquinone, ethylhydroquinone, n-propylhydroquinone, isopropylhydroquinone, isobutylhydroquinone, chlorohydroquinone, fluorohydroquinone, bromohydroquinone, iodohydroquinone, phenylhydroquinone, methoxyhydroquinone, phenoxyhydroquinone and the like. These substituted hydroquinones may be used in the production of the wholly aromatic polyester singly, or as a mixture therein, however, from the viewpoint of the production cost, methylhydroquinone is most preferable. The structural unit (C) is present in the wholly aromatic polyester in an amount of 5 to 45 mol %, preferably from 25 to 40 mol %.

The structural unit (D) is 1,4-naphthalenedioxy group which is derived from 1,4-naphthalene diol or a derivative thereof, for instance, an alkyl ether thereof, and the structural unit (D) is present in the totally aromatic polyester in an amount of 5 to 20 mol %, preferably from 8 to 15 mol %.

The structural unit (E) has a structure shown in the formula (E) and is derived from the compound represented by the under-mentioned formula (E')

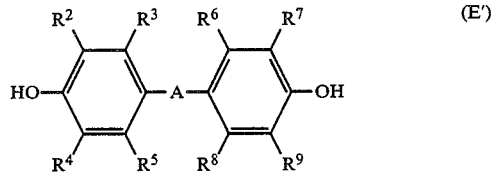
(E')

wherein A and the substituent of $R^2$ to $R^9$ are the same as defined in the formula (E). As the example of the compound shown above, 2,2-bis(4-hydroxyphenyl)propane, 2,2-bis(4-hydroxyphenyl)propane, 2,2-bis(4-hydroxy-3,5-dimethylphenyl)propane, 2,2-bis(4-hydroxy-3,5-dichlorophenyl)propane, 2,2-bis(4-hydroxy-3,5-dimethylphenyl)propane, 2,2-bis(4-hydroxy-3-methylphenyl)propane, 2,2-bis(4-hydroxy-3-chlorophenyl)propane, bis(4-hydroxyphenyl)methane, bis(4-hydroxy-3,5-dimethylphenyl)methane, bis(4-hydroxy-3,5-dichlorophenyl)methane, bis(4-hydroxy-3,5-dibromophenyl)methane, 1,1-bis(4-hydroxydiphenyl)cyclohexane, 4,4'-dihydroxydiphenyl-bis(4-hydroxyphenyl)ketone, bis(4-hydroxy-3,5-dimethylphenyl)ketone, bis(4-hydroxy-3,5-dichlorophenyl)ketone, bis(4-hydroxyphenyl)sulfide, bis(4'-hydroxy-3-chlorophenyl)sulfide, bis(4-hydroxy-3,5-dichlorophenyl)sulfide, bis(4-hydroxyphenyl)sulfone, bis(4-hydroxy-3,4-dichlorophenyl)ether, 4,4'-dihydroxybiphenyl and the like may be mentioned, and they may be used singly or as a mixture thereof, however, from the viewpoint of the production cost, 2,2-bis(4-hydroxyphenyl)propane, bis(4-hydroxyphenyl)sulfone and 4,4-dihydroxybiphenyl are more preferable.

The structural units (A), (C) and (D) are parasubstituted groups and form rigid structures, and exhibit an effect of improving the mechanical properties of the wholly aromatic polyester. On the other hand, the structural units (B), (C) and (D) have the molecular structure which shows asymmetry to the main chain of the wholly aromatic polyester, and exhibits an effect of relaxing the rigidity of the wholly aromatic polyester, which is exhibited by the structural units (A), (C) and (D). Further, the structural unit (E) also has an effect of providing softness and heat-resistance to the molecule of the wholly aromatic polyester.

Namely, owing to the structural units (B), (C), (D) and (E), the wholly aromatic polyester which has a liquid crystal temperature range in which the polyester is melt-moldable can be produced. In addition, particularly the isophthaloyl group of the structural unit (B) has an effect of bending the main chain of the wholly aromatic polyester by 60° from the straight chain thereof and accordingly, the structural unit (B) exhibits an effect of reducing the anisotropy of the physical properties of the molded articles made of the wholly aromatic polyester.

Furthermore, since the 1,4-dihydroxynaphthyl group of the structural unit (D) has a large asymmetry thereby reducing the rigidity of the main chain of the polymer, it also exhibits the effect of reducing the anisotropy of the physical properties of the molded articles.

Accordingly, by adjusting the relative content of each of the structural units in the polymer, it is possible to obtain a polymer which is melt-moldable and has an excellent mechanical properties and heat-resistance, and in addition, is less anisotropic concerning the physical properties thereof. Namely, the wholly aromatic polyester shows a melt viscosity of at least $5 \times 10^3$ poise at 350° C. and at a shearing velocity of $1 \times 10^2 \sec^{-1}$ when tested on a KOKA-type flow tester with a nozzle of 1 mm in diameter and 10 mm in length.

The judgement on whether a polymeric substance is able to show anisotropy in a molten state or not is suitably carried out on the basis of an optical method by a polarization microscope. Namely, after placing a specimen on a heat stage attached to a polarization microscope, the image of the specimen is observed under the microscope while using a transmitted light through the specimen or a reflected light by the specimen and raising the temperature of the specimen slowly from the room temperature.

On observation, the solid polymer which does not show anisotropy suddenly changes to the isotropic molten state at the melting point of the polymer, and on the other hand, the solid polymer which show anisotropy changes from the crystalline state into a liquid crystalline state when the temperature passes over a certain temperature and thereafter, the thus liquefied polymer shows a stable liquid crystalline state within a relatively broad range of temperature and then, with the raise of temperature thereover, the liquid crystalline polymer changes to the isotropic molten state. The above-mentioned method is the most convenient and simple method for judging the anisotropy of a polymeric substance.

The wholly aromatic polyester according to the present invention is obtained by subjecting the starting materials which respectively form the structural units (A), (B), (C) and (D) with or without the structural unit (E) to polycondensation. Namely, as the starting materials terephthalic acid or a derivative thereof, isophthalic acid or a derivative thereof, 2-substituted hydroquinone or a derivative thereof and 1,4-naphthalenediol or a derivative thereof, are subjected to polycondensation, or the above-mentioned starting materials and a compound represented by the formula (E') or a derivative thereof are subjected to polycondensation. In carrying out the polycondensation, one of the following, conventional methods, namely, melt-polymerization method, solution-polymerization method and interfacial polymerization method may be employed.

Namely, in the case of the melt-polymerization method, (i) terephthalic acid or a derivative thereof and isophthalic acid or a derivative thereof, (ii) an acylated, 2-substituted hydroquinone or a derivative thereof and an acylated, 1,4-naphthalendiol or a derivative thereof are mixed together with or without a compound represented by the formula:

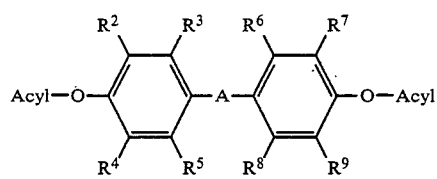

and the thus obtained mixture is subjected to polycondensation in molten state.

More definitely for instance, terephthalic acid, isophthalic acid, methylhydroquinone diacetate, 1,4-naphthalenediol diacetate were mixed together with or without 2,2-bis(4-hydroxyphenyl)propane diacetate, and the obtained mixture is heated to 250° to 350° C. under ordinary pressure to carry out polycondensation.

In order to promote the polycondensation (to attain 100% polymerization), it is necessary to remove the by-product of polymerization, for instance, acetic acid and acetic ester, out from the reaction system. For that purpose, the pressure of the reaction system is reduced to less than 1 mmHg after the distillation of the by-product under ordinary pressure comes to stop, and the distillation is continued under the reduced pressure while continuing polycondensation until the conversion reaches about 100% and the degree of polymerization of the polyester is sufficiently raised. Polycondensation is made to finish at that point.

In the case of the solution polymerization method, terephthaloyl dichloride, isophthaloyl dichloride, 2-substituted hydroquinone or a derivative thereof and 1,4-naphthalenediol or a derivative thereof are dissolved into an organic solvent together with or without a compound represented by the formula (E') or a derivative thereof, and are mixed and then subjected to polycondensation by heating the thus prepared mixture. As the organic solvent, a chlorinated hydrocarbon such as methylene chloride, ethylene dichloride, chloroform, alpha-chloronaphthalene, etc., toluene, benzene, nitrobenzene and the like may be mentioned generally.

Further, in the case of the interfacial polymerization method, for instance, (i) a solution of terephthaloyl dichloride and isophthaloyl dichloride in an organic solvent and (ii) an aqueous alkaline solution of 2-substituted hydroquinone or a derivative thereof and 1,4-naphthalenediol or a derivative thereof with or without the compound mentioned represented by the formula (E') or a derivative thereof are subjected to polycondensation at a temperature of lower than 50° C. In the case of the interfacial polymerization method, the same organic solvent as in tne case of solution polycondensation method may be used and the concentration of the acid chloride is in the range from 2 to 30% by weight in general.

As the alkali of the aqueous solution, NaOH, KOH, LiOH, Na$_2$CO$_3$, K$_2$CO$_3$ and the like may be used in an amount of 2 times by mol to the starting material (ii). The starting material (ii) is used as an aqueous 1 to 15% by weight solution of the alkali.

The thus formed polymer(polyester) may be isolated while employing a conventional method.

Since the wholly aromatic polyester according to the present invention can be melt-molded even at a temperature of lower than 350° C. and the thus molded articles show a high rigidity (a high modulus of elasticity), it is useful as a material for preparing small and accurate parts which necessitate thinner design such as connectors, sockets, bobbins used in electronic apparatus.

The present invention will be explained more in detail while referring to the non-limitative examples as follows.

EXAMPLE 1

After introducing 66.4 g (0.4 mol) of terephthalic acid, 16.1 g (0.1 mol) of isophthalic acid, 49.6 g (0.4 mol) of methylhydroquinone, 16.0 g (0.1 mol) of 1,4-naphthalenediol and 153 g of acetic anhydride into a vessel for polymerization provided with a stirrer, the vessel was immersed into an oil bath at 150° C., and after stirring the resultant mixture for 30 min under a flow of gaseous nitrogen, the mixture was heated to 280° C. within 30 min. At the time point when the rate of distillation of acetic acid and the excess acetic anhydride was reduced, the pressure of the reaction system was made to 0.5 Torr while continuing the reaction, and the polycondensation was made to finish at the time when the distillation was completely carried out.

The elementary analytical data of the thus obtained polyester are as follows:

|  | C (%) | H (%) |
|---|---|---|
| Found: | 71.41 | 3.91 |
| Calculated*: | 71.66 | 3.82 |

(*on the assumption that the ratio of charge is the same as the composition ratio.)

The polyester showed optical anisotropy in a molten state at a temperature of higher than 350° C. when observed under a polarization microscope (made by NIPPON KOGAKU Co., Ltd., Model XTP-11) provided with a heat-stage (made by Zeiss Co.).

The polyester was molded into tapes of 40 mm in length, 6 mm in width and 1 mm in thickness while using an injection molding machine (made by NIPPON KOGYO Co., Ltd., Model J5S) at a cylinder temperature of 300° to 330° C., and the thus prepared tapes were tested for bending properties by a Tensilon ® tester (made by TOYO-Baldwin Co., Ltd., Model UTM-5T) at a bending velocity of 1 mm/min while holding a specimen between the two fulcra at a distance of 30 mm.

Further, after compression-molding the thus prepared tapes into cylindrical test pieces of 12 mm in diameter and 7.5 mm in height by a pressing machine, the test piece was tested on the thermal deforming temperature thereof by a Plastometer (made by TOYO SEIKI Co., Ltd.) under a load of 18.6 kg. The thermal deformation temperature was represented by the temperature at which the concentration of the test piece was commenced.

The results of the above-mentioned tests are shown in Table 1, and an infrared absorption spectrum of the polyester is shown in FIG. 1. In addition, the melt viscosity of the polyester was $2.5 \times 10^4$ poise at 350° C. and at a shearing velocity of $1 \times 10^2$ sec$^{-1}$.

EXAMPLE 2

After introducing 10.15 g (0.05 mol) of terephthaloyl dichloride, 40.6 g (0.20 mol) of isophthaloyl dichloride, 24.8 g (0.20 mol) of methylhydroquinone, 8.0 g (0.05 mol) of 1,4-naphthalenediol and 500 ml of alpha-chloronaphthalene into a vessel for polymerization provided with a stirrer, the vessel was immersed in an oil bath at room temperature. On heating the vessel under a flow of gaseous nitrogen to about 280° C., an evolution of hydrogen chloride began at about 130° C. After carrying out polycondensation for 5 hours at 280° C., the reaction was made to finish. After pouring the reaction mixture into methanol to precipitate the polyester, the thus obtained polyester was washed with hot methanol repeatedly to remove the solvent used in the reaction. Physical properties of the thus obtained polyester were measured by the same procedures as in Example 1, the results being shown in Table 1.

EXAMPLE 3

After introducing 66.4 g (0.4 mol) of terephthalic acid, 16.6 g (0.10 mol) of isophthalic acid, 43.4 g (0.35 mol) of methylhydroquinone, 11.4 g (0.05 mol) of 2,2-bis(4-hydroxyphenyl)propane, 16.0 g (0.1 mol) of 1,4-naphthalenediol and 153 g of acetic anhydride into a vessel for polymerization provided with a stirrer, the vessel was immersed in an oil bath at 150° C. Thereafter, polycondensation was carried out in the same manner as in Example 1. The physical properties of the thus obtained polyester were measured by the same methods as in Example 1 and shown in Table 1.

COMPARATIVE EXAMPLE

After introducing 54.0 g (0.3 mol) of p-acetoxybenzoic acid and 34.0 g (0.2 mol) of polyethylene terephthalate into a vessel for polymerization provided with a stirrer and purging the aerial space of the vessel by gaseous nitrogen three times, the vessel was immersed in an oil bath at 275° C., and then the resultant mixture was stirred for one hour under a flow of gaseous nitrogen. Thereafter, the mixture was stirred for 3 hours under a pressure of 0.3 mmHg to remove acetic acid in the reaction mixture completely. Physical properties of the thus obtained polyester were measured by the same methods as in Example 1, the results being shown in Table 1.

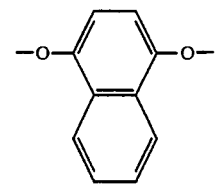

and

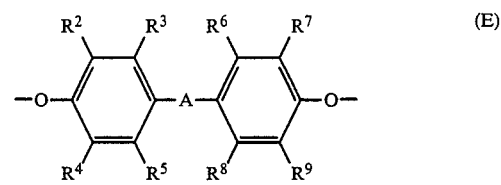

wherein A represents an oxygen atom, a sulfur atom, a sulfonyl group, a carbonyl group, an alkylene group or an alkylidene group, or a single bond directly connecting the two benzene rings and $R^2$,

TABLE 1

| Example or Comparative Example | Flexural modulus (kg/mm$^2$) MD*1 | Flexural modulus (kg/mm$^2$) TD*2 | Flexural strength (kg/mm$^2$) MD | Flexural strength (kg/mm$^2$) TD | Tensile properties Elastic modulus (kg/mm$^2$) | Tensile properties Strength (kg/mm$^2$) | Tensile properties Elongation at break (%) | Temperature of thermal deformation (°C.) | Temperature range of optical anisotropy (°C.) |
|---|---|---|---|---|---|---|---|---|---|
| Example 1 | 1500 | 1060 | 10.7 | 10.6 | 700 | 6.5 | 4.0 | 250 | 350~ |
| Example 2 | 1610 | 950 | 22.6 | 14.9 | 720 | 6.1 | 4.0 | 230 | 350~ |
| Example 3 | 1500 | 800 | 19.1 | 10.0 | 600 | 5.9 | 5.0 | 245 | 350~ |
| Comparative Comparative | 1400 | 290 | 13.3 | 7.8 | 880 | 13.9 | 12.0 | 65 | 200~350 |

Notes:
*1 means the flexural modulus in the direction parallel to the flow of the polyester in molding.
*2 means the flexural molulus in the direction perpendicular to the flow of the polyester in molding.

What is claimed is:

1. A wholly aromatic polyester consisting essentially of structural units represented by the formulae (A), (B), (C), (D) and (E):

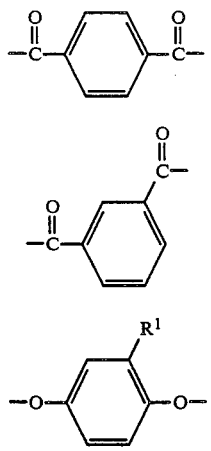

wherein $R^1$ represents a halogen atom, a hydrocarbon group, an alkoxy group or a phenoxy group, $R^3$, $R^4$, $R^5$, $R^6$, $R^7$, $R^8$ and $R^9$ represent respectively a hydrogen atom, a halogen atom or a hydrocarbon group, the wholly aromatic polyester containing 5 to 50 mol % of the unit (A), 5 to 45 mol % of the unit (B), 5 to 45 mol % of the unit (C), 5 to 20 mol % of the unit (D) and 0 to 10 mol % of the unit (E), and the sum of the amounts of the unit (A) and the unit (B) and the sum of the amounts of the unit (C), the unit (D) and the unit (E) being substantially equimolar.

2. The wholly aromatic polyester according to claim 1, wherein said wholly aromatic polyester contains 30 to 45 mol % of the unit (A), 8 to 30 mol % of the unit (B), 25 to 40 mol % of the unit (C), 8 to 15 mol % of the unit (D) and 0 to 10 mol % of the unit (E), and the sum of the amounts of the unit (A) and the unit (B) and the sum of the amounts of the unit (C), the unit (D) and the unit (E) is substantially equimolar.

3. The wholly aromatic polyester according to claim 1, wherein structural unit (C) is formed from methylhydroquinone, ethylhydroquinone, n-propylhydroquinone, isopropylhydroquinone, isobutylhydroquinone, chlorohydroquinone, fluorohydroquinone, bromohydroquinone, iodohydroquinone, phenylhydroquinone, methoxyhydroquinone, or phenoxyhydroquinone as a monomer reactant.

4. The wholly aromatic polyester according to claim 1, wherein structural unit (E) is formed from 2,2-bis(4-hydroxyphenyl)propane, 2,2-bis(4-hydroxy-3,5-dimethylphenyl)propane, 2,2-bis(4-hydroxy-3,5-dichlorophenyl)propane, 2,2-bis(4-hydroxy-3-methylphenyl)propane, 2,2-bis(4-hydroxy-3-chlorophenyl)propane, bis(4-hydroxyphenyl)methane, bis(4-hydroxy-3,5-dimethylphenyl)methane, bis(4-hydroxy-3,5-dichlorophenyl)methane, bis(4-hydroxy-3,5-dibromophenyl)methane, 1,1-bis(4-hydroxydiphenyl)cyclohexane, 4,4'-dihydroxydiphenylbis(4-hydroxyphenyl)ketone, bis(4-hydroxy-3,5-dimethylphenyl)ketone, bis(4-hydroxy-3,5-dichlorophenyl)ketone, bis(4-hydroxyphenyl)sulfide, bis(4-hydroxy-3-chlorophenyl)sulfide, bis(4-hydroxy-3,5-dichlorophenyl)sulfide, bis(4-hydroxyphenyl)sulfone, bis(4-hydroxy-3,5-dichlorophenyl)ether, or 4,4'-dihydroxybiphenyl.

5. The wholly aromatic polyester according to claim 1, wherein said polyester has a melt viscosity of at least $5 \times 10^3$ poise at 350° C. and at a shearing velocity of $1 \times 10^2$ sec$^{-1}$ when tested on a KOKA flow tester having a nozzle of 1 mm in diameter and a length of 10 mm.

6. A process for producing a wholly aromatic polyester consisting essentially of units represented by the formulae (A), (B), (C), (D) and (E):

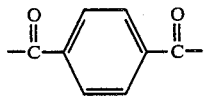
(A)

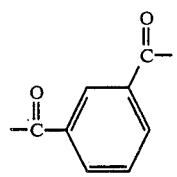
(B)

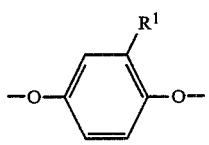
(C)

wherein $R^1$ represents a halogen atom, a hydrocarbon group, an alkoxy group or a phenoxy group,

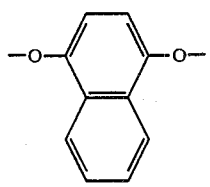
(D)

and

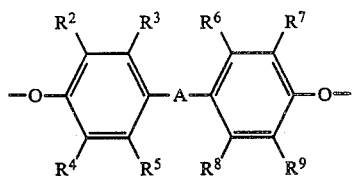
(E)

wherein A represents an oxygen atom, a sulfur atom, a sulfonyl group, a carbonyl group, an alkylene group or an alkylidene group or a single bond directly connecting the two benzene rings, the wholly aromatic polyester containing 5 to 50 mol % of the unit (A), 5 to 45 mol % of the unit (B), 5 to 45 mol % of the unit (C), 5 to 20 mol % of the unit (D) and 0 to 10 mol % of the unit (E), and the sum of the amounts of the unit (A) and the unit (B) and the sum of the amounts of the unit (C), the unit (D) and the unit (E) being substantially equimolar, which process comprises:

melt polymerizing (i) terephthalic acid, terephthaloyl dichloride or an alkyl terephthalate compounds, (ii) isophthalic acid, isophthaloyl dichloride or an alkyl isophthalate compound, (iii) an acylated 2-substituted hydroquinone compound, (iv) an acylated 1,4-naphthalenediol compound and optionally (v) a compound of the formula:

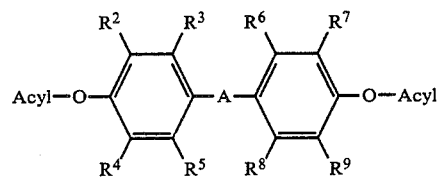

at a temperature of 250° to 350° C.; and
removing the volatile product produced as a result of the polymerization reaction.

7. The process according to claim 6, wherein said wholly aromatic polyester contains 30 to 45 mol % of the unit (A), 8 to 30 mol % of the unit (B), 25 to 40 mol % of the unit (C), 8 to 15 mol % of the unit (D) and 0 to 10 mol % of the unit (E), and the sum of the amounts of the unit (A) and the unit (B) and the sum of the amounts of the unit (C), the unit (D) and the unit (E) is substantially equimolar.

8. The process according to claim 6, wherein the unit (C) is derived from methylhydroquinone.

9. The process according to claim 6, wherein the unit (E) is derived from 2,2-bis(4-hydroxyphenyl)propane or 4,4'-dihydroxydiphenyl.

10. A process for producing a wholly aromatic polyester consisting essentially of structural units represented by the formulae (A), (B), (C), (D) and (E):

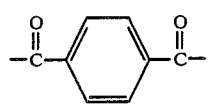
(A)

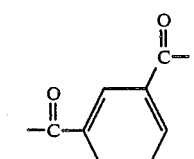
(B)

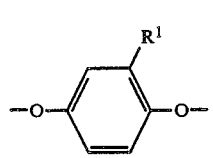
(C)

wherein $R^1$ represents a halogen atom, a hydrocarbon group, an alkoxy group or a phenoxy group,

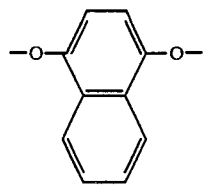
and

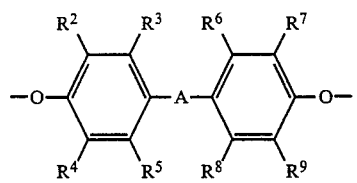

wherein A represents an oxygen atom, a sulfur atom, a sulfonyl group, a carbonyl group, an alkylene group or an alkylidene group or a single bond directly connecting the two benzene rings, the wholly aromatic polyester containing 5 to 50 mol % of the unit (A), 5 to 45 mol % of the unit (B), 5 to 45 mol % of the unit (C), 5 to 20 mol % of the unit (D) and 0 to 10 mol % of the unit (E), and the sum of the amounts of the unit (A) and the unit (B) and the sum of the amounts of the unit (C), the unit (D) and the unit (E) being substantially equimolar, which process comprises:

dissolving (i) terephthaloyl dichloride, (ii) isophthaloyl dichloride, (iii) a 2-substituted hydroquinone compound or an acylated 2-substituted hydroquinone compound, (iv) a 1,4-naphthalenediol or an acylated 1,4-naphthalenediol compound and optionally (v) a compound of the formula:

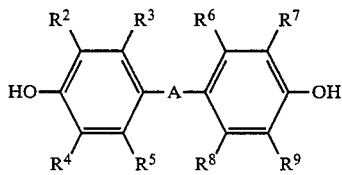

or a compound of the formula:

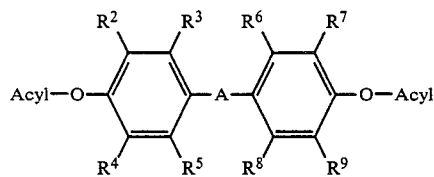

in an organic solvent: and
heating the solution containing the monomers to effect polycondensation.

11. The process according to claim 10 wherein said organic solvent is a chlorinated hydrocarbon or an aromatic hydrocarbon.

12. The process according to claim 10, wherein said wholly aromatic polyester contains 30 to 45 mol % of the unit (A), 8 to 30 mol % of the unit (B), 25 to 40 mol % of the unit (C), 8 to 15 mol % of the unit (D) and 0 to 10 mol % of the unit (E), and the sum of the amounts of the unit (A) and the unit (B) and the sum of the amounts of the unit (C), the unit (D) and the unit (E) is substantially equimolar.

13. The process according to claim 10, wherein the unit (C) is derived from methylhydroquinone.

14. The process according to claim 10, wherein the unit (E) is derived from 2,2-bis(4-hydroxyphenyl)propane or 4,4'-dihydroxydiphenyl.

15. A process for producing a wholly aromatic polyester consisting essentially of units represented by the formulae (A), (B), (C), (D), and (E):

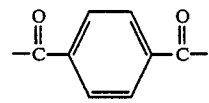

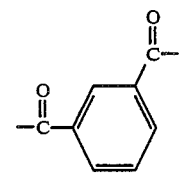

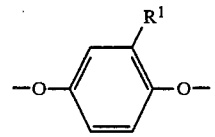

wherein $R^1$ represents a halogen atom, a hydrocarbon group, an alkoxy group or a phenoxy group,

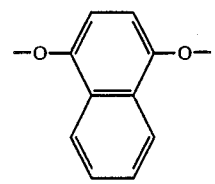

and

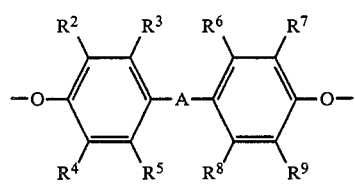

wherein A represents an oxygen atom, a sulfur atom, a sulfonyl group, a carbonyl group, an alkylene group or an alkylidene group or a single bond directly connecting the two benzene rings, the wholly aromatic polyester containing 5 to 50 mol % of the unit (A), 5 to 45 mol % of the unit (B), 5 to 45 mol % of the unit (C), 5 to 20 mol % of the unit (D) and 0 to 10 mol % of the unit (E), and the sum of the amounts of the unit (A) and the unit (B) and the sum of the amounts of the unit (C), the unit (D) and the unit (E) being substantially equimolar, which process comprises:

interfacially condensing (i) a solution of terephthaloyl dichloride, and isophthaloyl dichloride in an organic solvent and (ii) an aqueous alkaline solution of a 2-substituted hydroquinone compound or an acylated 2-substituted hydroquinone compound, 1,4-naphthalenediol or an acylated 1,4-naphthalenediol compound and optionally a compound of the formula:

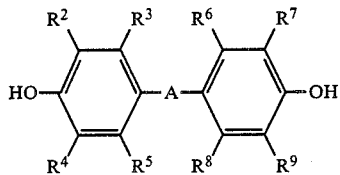

or a compound of the formula:

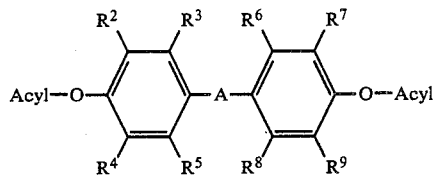

at a temperature less than 50° C.; and isolating the polymer product.

16. The process according to claim 15, wherein the alkali component of said aqueous solution is NaOH, KOH, LiOH, $Na_2CO_3$ or $K_2CO_3$, and the amount of said alkali is about twice the molar content of monomers in the aqueous solution and the aqueous solution being a 1 to 15% by weight solution of the alkali.

17. The process of claim 15, wherein the concentration of acid chloride monomers in the organic solvent solution ranges from 2 to 30% by weight.

18. The process according to claim 15, wherein said wholly aromatic polyester contains 30 to 45 mol % of the unit (A), 8 to 30 mol % of the unit (B), 25 to 40 mol % of the unit (C), 8 to 15 mol % of the unit (D) and 0 to 10 mol % of the unit (E), and the sum of the amounts of the unit (A) and the unit (B) and the sum of the amounts of the unit (C), the unit (D) and the unit (E) is substantially equimolar.

19. The process according to claim 15, wherein the unit (C) is derived from methylhydroquinone.

20. The process according to claim 15, wherein the unit (E) is derived from 2,2-bis(4-hydroxyphenyl)propane or 4,4'-dihydroxydiphenyl.

* * * * *